United States Patent [19]

Kuo

[11] Patent Number: 4,819,464

[45] Date of Patent: Apr. 11, 1989

[54] WIRELOCK PROTECTOR

[76] Inventor: Wen T. Kuo, No. 16, Lane 459, Sec. 1, An Ho Road, Tainan, Taiwan

[21] Appl. No.: 125,833

[22] Filed: Nov. 27, 1987

[51] Int. Cl.⁴ .............................................. E05B 73/00
[52] U.S. Cl. ............................................. 70/18; 70/49
[58] Field of Search .................... 70/49, 18, 30, 14, 15

[56] References Cited

U.S. PATENT DOCUMENTS

| | | | |
|---|---|---|---|
| 3,855,824 | 12/1974 | Falk | 70/49 |
| 4,028,916 | 6/1977 | Penker | 70/49 |
| 4,325,238 | 4/1982 | Scherbing | 70/18 |

Primary Examiner—Robert L. Wolfe
Attorney, Agent, or Firm—Lowe, Price, LeBlanc, Becker & Shur

[57] ABSTRACT

This invention relates to a wirelock protector and in particular to one including a lock housing, a latching and a lock shell. The lock housing is to prevent dirt or water from permeating into a lock. The latch housing has the same function as to prevent dirt or water from permeating into a latch. The lock shell is to fix the lock housing at a fixed place to prevent the lock from hitting and damaging the locked body.

3 Claims, 5 Drawing Sheets

WIRELOCK PROTECTOR

BACKGROUND OF THE INVENTION

This invention relates to a wirelock protector. A bicycle lock normally comprises a lock, a latch and a wire. This bicycle lock tends to hit and damage the bicycle frame when riding on a bumping road. Besides water and dirt may easily permeate into the lock and the latch.

SUMMARY OF THE INVENTION

This invention relates to a wirelock protector.

It is a primary object of the present invention to provide a wirelock protector which may prevent contamination by dirt or water.

It is another object of the present invention to provide a wirelock protector which may prevent a locked body (e.g., bicycle frame) from being damaged by a hitting force from the lock when riding on a bumping road.

It is an object of the present invention to provide a wirelock protector which is of simple construction.

It is a further object of the present invention to provide a wirelock protector which is economical to produce.

DETAILED DESCRIPTION OF THE PREFERRED EMBODIMENT

Figure 1:
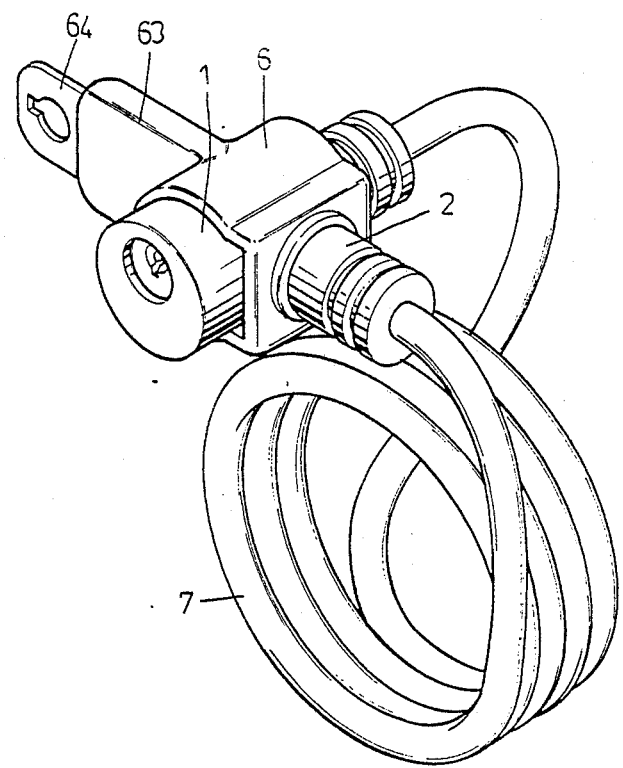
FIG. 1 is a perspective view of the present invention.

FIG. 1 is a perspective view of the present invention comprising a lock shell 6, a lock housing 1 with a lock placed inside, a latch housing 2 with a latch placed inside and a wire 7.

Figure 2:
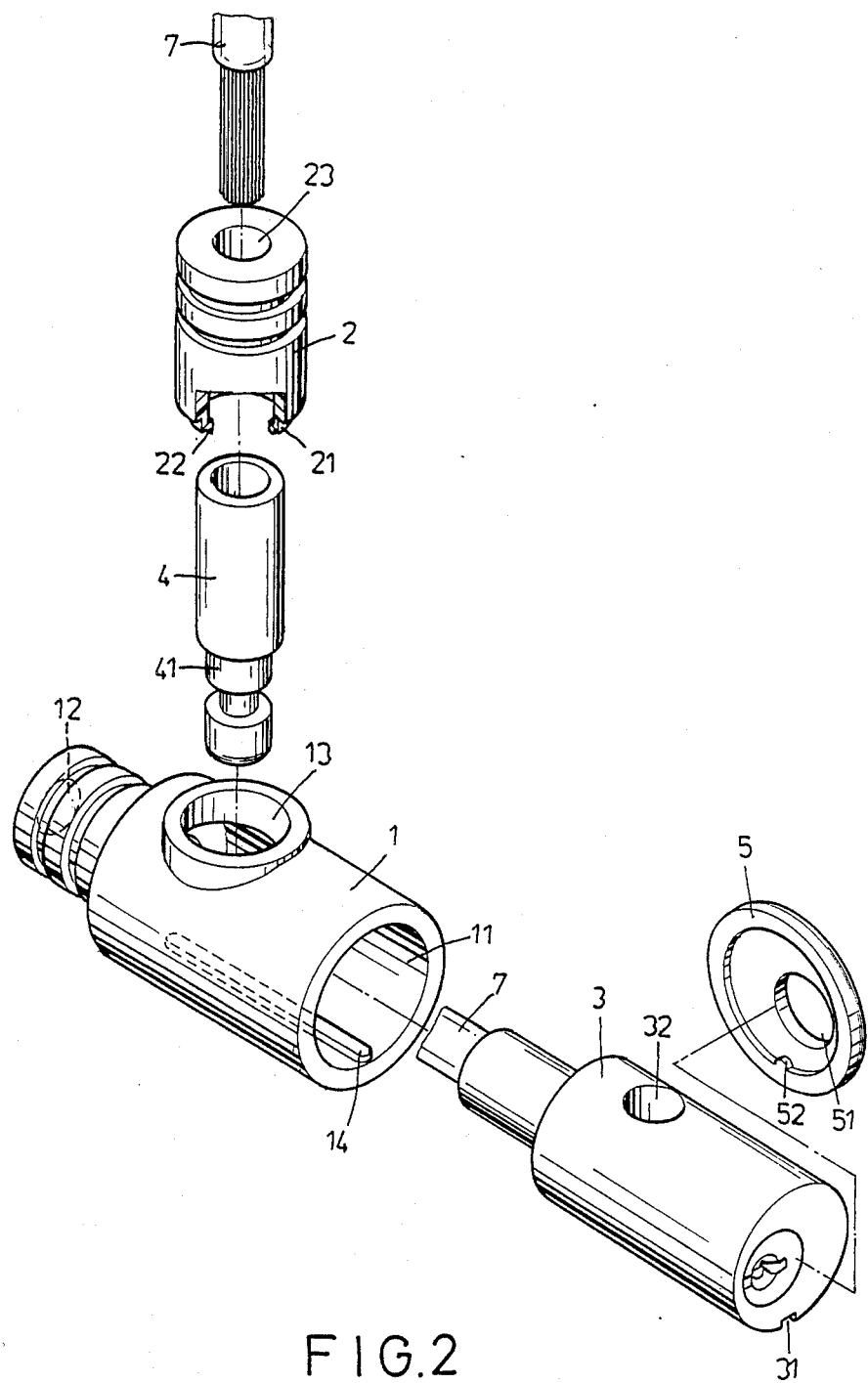
FIG. 2 is an fragmental view of two housings of the present invention.

FIG. 2 is an exploded view of the present invention having a lock housing 1, a latch housing 2, a lock 3, a latch 4 and a hub 5. The lock housing 1 has a lock insertion hole 11 formed at one end of the lock housing for the insertion of the lock 3, a wire insertion hole 12 formed at the other end of the lock housing to receive the wire 7 inserted therein, a latch insertion hole 13 on one side of the housing 1 for the insertion of the wire 7 and a key seat 14 at the inner side of the housing 1. Lock 3 has a key way 31 at one side for the insertion of the key seat 14 of the lock housing 1 and a latch hole 32 at its top. The latch housing 2 has chamfer 21 and protuberance 22 at its one end and a wire insertion hole 23 at other end. The chamfer 21 enables the latch housing 2 to be closed and sealed with the latch insertion hole 13 of the lock housing 1. The protuberance 22 is to clamp the circular trough 41 of the latch 4. The wire insertion hole 23 of the latch housing 2 receives wire 7 to be inserted therein. The latch 4 has circular trough or step portion 41 which is to be clamped by the protuberance 22 when inserted into the latch housing. The hub 5 has a key hole 51 for the reception of a key and a key seat 52 for the reception of the key way 31 of the lock 3.

This hub 5 will be connected with the lock housing 1 by ultrasonic welding when lock 3 is placed inside of the housing 1. Upon placing lock 3 inside of the lock housing 1, the key way 31 of the lock 3 will slide on the key seat 14 of the lock housing 1, hence the lock 3 is fixed in the housing 1 and can not move randomly. The latch 4, upon inserted into the latch housing 2, will be clamped by the protuberance 22 of the latch housing 2 thus the latch 3 can not move in the latch housing 2. By inserting lock 3 into the lock housing 1, placing the hub 5 on the lock insertion hole 11 of the lock housing 1 and using ultrasonic welding to seal the hub 5, no water or dirt may permeate therethrough.

Figure 3:
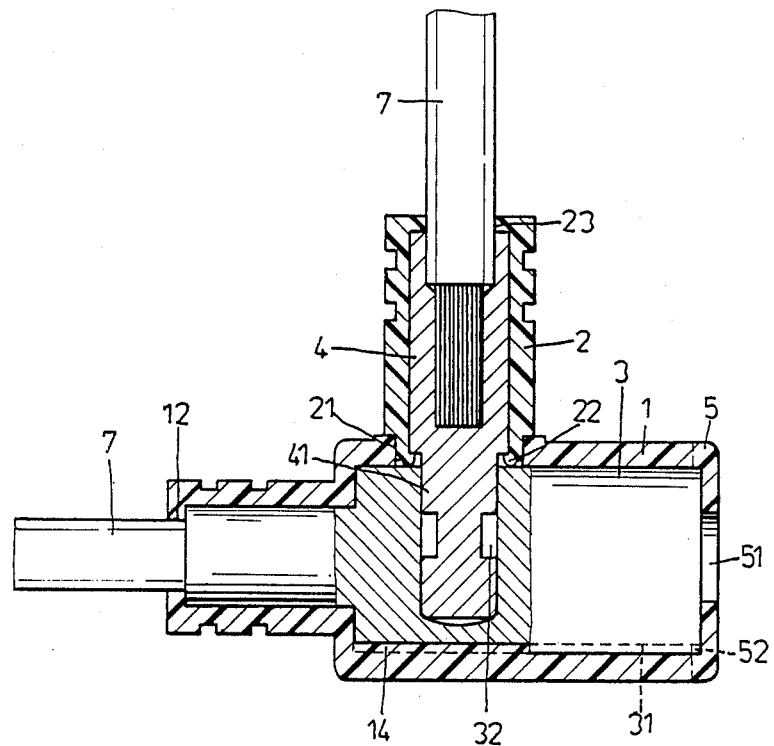
FIG. 3 is a sectional view of two housings of the present invention having a lock and a latch placed inside respectively.

FIG. 3 as a sectional view of the lock housing 1 and the latch housing 2 of the present invention having the lock 3 and the latch 4 inserted and locked. As can be seen, the protuberance 22 of the latch housing 2 has clamped the latch 4 and the chamfer 21 of the latch housing 2 is in service contact with the latch insertion hole 13 of the lock housing 1; the key way 31 is on the key seat 14, thus, the lock 3 placed in the lock housing 1 is fixed and cannot move randomly.

Figure 4:
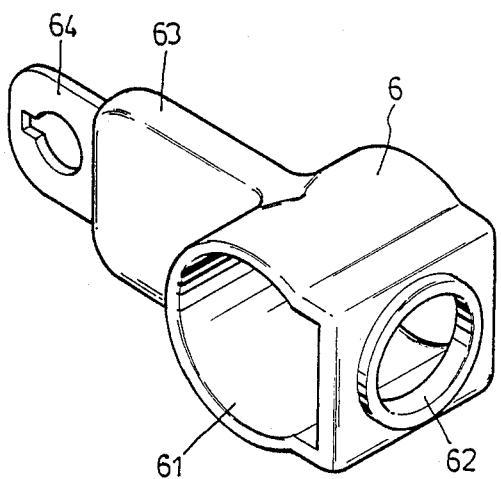
FIG. 4 is a perspective view of a lock shell of the present invention.

FIG. 4 shows the lock shell 6 having a trough 61, a latch insertion hole 62, an arm 63 and a steel plate fixture 64. The trough 61 of the lock shell 6 is shaped like a mushroom. The arm 62 has wrapped the steel plate fixture 64 to connect the trough 61 and the steel plate fixture 64 together. The steel plate fixture 64 which is wrapped by the arm 63 has an opening at its center for fixing the lock shell 6 with a screw or a bolt either on a bicycle or other places.

Figure 5:
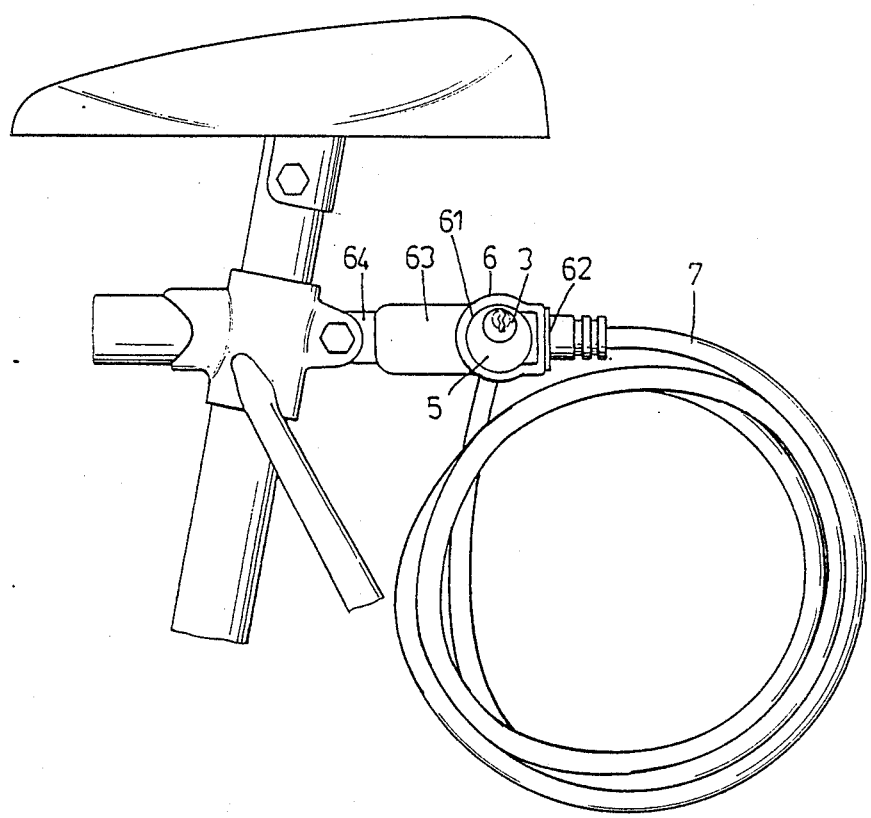
FIG. 5 is a preferred embodiment view of the present invention.

FIG. 5 shows the lock shell 6 of the present invention is installed on a bicycle with a screw. As can be seen, the lock 3 is placed in the lock housing 1 and the latch 4 is placed in the latch housing 2 and the wire 7 is fixed in the two wire insertion hole 13 and 23 of the lock housing 1 and the latch housing 2. The lock with the present invention is ready for use.

I claim:

1. A wirelock protector comprising a lock housing, a lock, a latch, a latching housing and a lock shell surrounding the lock housing, said lock housing having a lock insertion hole, a wire insertion hole, a latch insertion hole and a key seat, said lock insertion hole being formed at one end of the lock housing for the insertion of said lock into said locking housing, said wire insertion hole being formed at the other end of the lock housing for the insertion of a wire, said wire insertion hole being smaller in size than the lock to prevent the lock from being pulled therethrough, said latch insertion hole being formed on one side of said lock housing for the insertion of said latch, said key seat being formed at an inner end of said lock housing to receive a key way on the lock to prevent the lock from rotating within the lock housing;

said lock housing having a circular chamfer and a protuberance both at one end thereof and a wire insertion hole at an other end thereof, said chamfer contacting with said latch insertion hole of said lock housing, said protuberance engaging a step portion of the latch to hold the latch in the latch housing, said wire insertion hole being formed smaller in size than said latch to prevent said latch from being pulled therethrough;

and a hub welded to the lock housing to prevent dirt or water from permeating therethrough.

2. The wirelock protector of claim 1, said lock shell having a mushroom-shaped trough, a latch insertion hole, an arm and a steel plate fixture, said trough being formed at one end of said lock shell for the insertion of said lock housing, said latch insertion hole being formed at the center of a flatted side of the lock shell for the insertion of said latch, said arm being formed to wrap around said steel plate fixture and connect said trough and said steel plate fixture together, said steel plate fixture being wrapped by said arm having an opening at its center adapted for securing said lock shell with a screw or a bolt to a body to be locked with said protector;

whereby when said lock and said latch are placed into said lock housing and said latch housing, no water or dirt may permeate through, and when the lock housing is placed in the lock shell, the lock housing is at a fixed location wherein it will not hit or damage the locked body.

3. A wirelock protector comprising a lock housing, a lock, a latch, a latching housing and lock shell surrounding the lock housing, said lock housing including a latch insertion hole and a lock insertion hole, said latch housing having a circular chamfer and a protuberance both at one end of the latch housing, said chamfer contacting with said latch insertion hole of the lock housing and said protuberance engaging to clamp against a step portion of the latch to tightly maintain the latch within the latch housing, and further including a hub welded to the lock housing to sealingly prevent dirt or water from permeating therethrough.

* * * * *